Dec. 8, 1964  S. T. TRANSEAU  3,159,939
FISHING ROD PROTECTIVE ATTACHMENT
Filed May 9, 1963
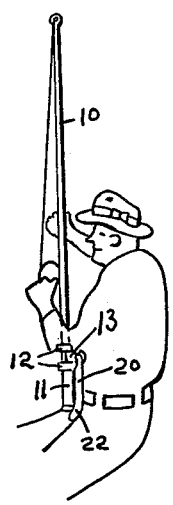
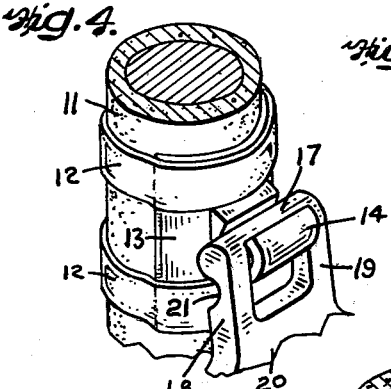
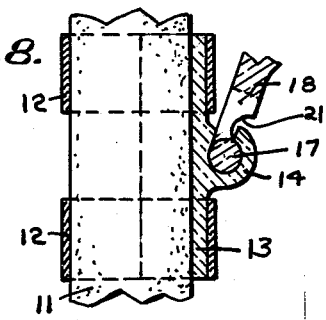
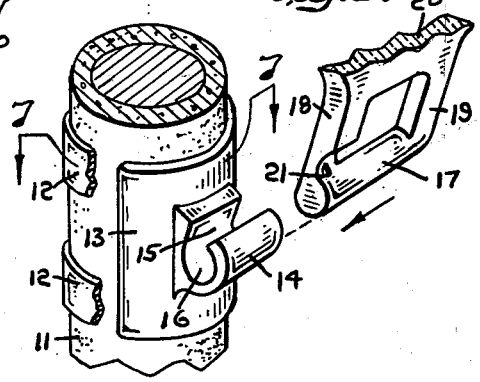
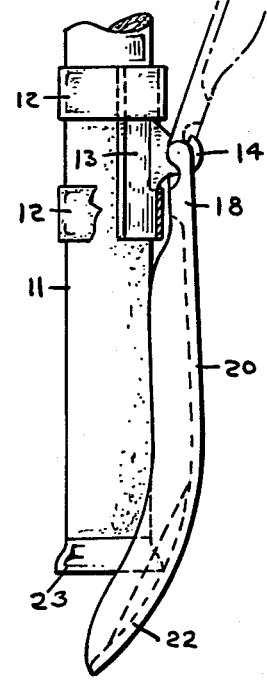
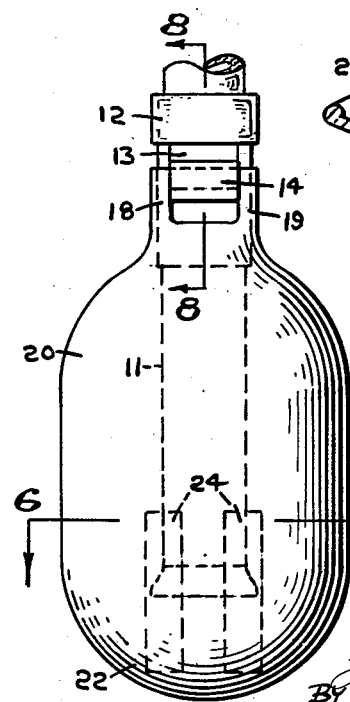
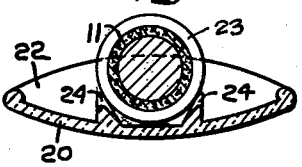
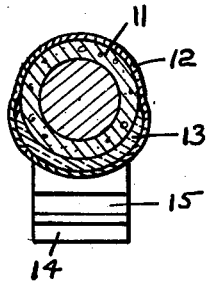
INVENTOR.
SHERMAN T. TRANSEAU
BY *Len Edelson*
ATTORNEY

United States Patent Office 3,159,939
Patented Dec. 8, 1964

3,159,939
FISHING ROD PROTECTIVE ATTACHMENT
Sherman T. Transeau, Riverside, N.J.
Filed May 9, 1963, Ser. No. 279,100
7 Claims. (Cl. 43—21.2)

This invention relates generally to fishing rods, and more particularly relates to an attachment for fishing rods by means of which the butt of the rod handle is prevented from digging into the abdomen of the fisherman when the latter braces the rod butt against the abdomen during the course of playing a hooked fish. The protector achieves its purpose by transferring the force which would normally be applied against the body by the edge of the rod butt to a relatively large area to thereby sharply reduce the exerted pressure per unit area exerted on the fisherman's body. The attachment according to the invention is a two piece device wherein one of such pieces is secured to the fishing rod handle and the other piece is detachably interlatched therewith for use or removal as desired, the provision of such a fishing rod attachment being a primary object of this invention.

Another object of this invention is to provide a novel fishing rod attachment as aforesaid in which the piece thereof which is secured to the fishing rod handle is relatively small in size and functions as an anchoring means for the other piece of the two part attachment which is the broad area pressure distributing part of the device, and which is substantially larger than the handle secured piece.

Yet another object of this invention is to provide a novel fishing rod attachment for relieving the pressure exerted against the body of a fisherman by a fishing rod handle butt, as aforesaid, in which the pressure distributing part of the attachment device includes means which interfit with the butt of the fishing rod to prevent lateral pivoting or wobble therebetween.

The foregoing and other objects of the invention will become clear from a reading of the following specification in conjunction with an examination of the appended drawings, wherein:

FIGURE 1 illustrates diagrammatically the organization of the fishing rod attachment according to the invention secured to a fishing rod and in use by a fisherman;

FIGURE 2 illustrates on an enlarged scale the lower or butt end of a fishing rod to which is attached the fishing rod attachment device of the invention, the swingable body pad part of the device being also illustrated in broken line in an upwardly swung position required for separation of the two interlocked pieces of the attachment;

FIGURE 3 is a showing of the attachment device and handle end of the fishing rod of FIGURE 2, but as would be seen when viewed from the right;

FIGURE 4 is an enlarged fragmentary perspective view of the part of the fishing rod handle to which the attachment device is secured with the two parts of the attachment illustrated in interlocked use position;

FIGURE 5 is similar to FIGURE 4 but illustrates the body pad portion of the attachment in upwardly swung and laterally shifted position to thereby effect separation or interfit of the two pieces of the attachment device;

FIGURE 6 is a cross-sectional view through the fishing rod handle and body pressure pad portion of the attachment as would be seen when viewed along the line 6—6 of FIGURE 3;

FIGURE 7 is a cross-sectional view through the fishing rod portion of FIGURE 5 as would be seen when viewed along the line 7—7 thereof; and FIGURE 8 is a vertical sectional view on a somewhat enlarged scale as would be seen when viewed along the line 8—8 of FIGURE 3 with the pressure pad portion of the attachment in upswung position and with the handle portion of the fishing rod shown in elevation.

In the several figures, like elements are denoted by like reference characters.

Turning now to the figures, there will be seen in FIGURE 1 a fisherman holding a fishing rod 10 having a handle portion 11 to which is secured by means of straps, tapes or bands 12 an arcuate plate member 13 curved about a portion of the handle 11 and from the outward presenting face of which projects an upwardly curving hook formation 14 having a slotted open top 15 extending downward to merge with a generally cylindrical bore formation 16 open at opposite ends of the hook formation 14 and having its axis disposed at substantially a right angle to the axis of the fishing rod handle 11, as best seen in the showing of FIGURES 4, 5 and 8.

Disposed within the cylindrical bore formation 16 of the arcuate plate member hook formation 14 is a cylindrical piece 17 of substantially the same cross-sectional area as that of the bore 16 so that the piece 17 can not shift laterally out of the bore through the slotted open top 15 of the hook formation. The cylindrical piece 17 extends through the bore 16 outward beyond the opposite open ends of the hook formation 14 as a bridging element between a pair of substantially parallel arms 18 and 19 which extend transversely to the axis of the cylindrical piece 17 for a distance and then join the large surfaced pressure reducing and relatively stiff body contacting pad piece 20. The arms 18 and 19 are as thick as the diameter of the cylindrical piece 17 excepting for the recessed-back portion 21 of arm 18 which is somewhat smaller than the width of the slotted open top 15 of the hook formation 14.

Thus, as best seen in FIGURES 5 and 8, the cylindrical piece 17 may be slipped endwise into the bore 16 of the hook formation 14 so that the arm 18 passes through and endwise beyond the slot 15, whereupon the pad piece 20 may be pivoted downward as shown in FIGURE 4 into locked engagement with the hook formation 14 of the arcuate plate member 13. Once the pad piece 20 is pivoted downward the cylindrical piece 17 is restrained from axial shifting by abutment of the arms 18 and 19 with the opposite ends of the hook formation 14, while being prevented from shifting out of the bore 16 by virtue of the fact that the slotted open top 15 of the hook formation 14 is of narrower width than the diameter of the cylindrical piece 17. Thus, the pad piece 20 is securely interlocked with the arcuate plate member 13. In this arrangement the hook formation 14 functions as a hinge loop, and the cylindrical piece 17 operates as a swinging pintle to which the pad piece 20 is secured.

As best seen in FIGURES 2 and 6, the pad piece 20 is considerably wider than the handle of the fishing rod and extends downward and curves under, as at 22, the lower end 23 of the rod handle 11. As also best seen in FIGURES 2, 3 and 6, the curved lower end 22 of the pad piece 20 is provided with a pair of spaced apart ridge formations 24 between which the lower end 23 of the rod handle 11 is positionable when the pad piece 20 is in use position. These ridge formations 24 prevent lateral wobble of the pad piece 20 relative to the fishing rod handle 11. The pad piece 20 may be quickly and easily detached by merely swinging it upward into the phantom line position illustrated in FIGURE 2 and then shifting it edgewise to move the cylindrical piece 17 out of the bore 16 of the hook formation 14 in the manner shown in FIGURE 5.

As seen in FIGURE 1, the pad piece 20 is disposable against the body of the fisherman by merely pressing the same flatwise thereagainst. If desired the lower end 22 of the pad piece 20 may be slipped behind the fisherman's belt from above and then moved downward so that the pad piece 20 is held between the fisherman's body and his belt to provide a firmer anchoring therefor. The two piece fishing rod attachment may be made of metal or molded from plastics as may be desired, or formed in any other convenient fashion. Additionally, other means for securing the arcuate plate member 13 to the fishing rod handle 11 may be employed and the straps, tapes or bands 12 dispensed with. Also, other hinging means may be employed for hingedly connecting the pad piece 20 to its supporting plate member 13, as by providing the plate member and pad piece with cooperating hinge elements held together by a removable hinge bolt or pin.

Having now described my invention in connection with a particularly illustrated embodiment thereof, it will be appreciated that modifications and variations of the same may now occur from time to time to those persons normally skilled in the art without departing from the essential scope or spirit of my invention, and accordingly it is intended to claim the same broadly as well as specifically as indicated by the appended claims.

What is claimed as new and useful is:

1. An attachment device for securement to the handle of a fishing rod comprising in combination, a broad convex-surfaced relatively stiff pad disposable with its convex surface against the fisherman's body for reducing the pressure exerted on the body by the handle butt of the fishing rod, and means for securing said pad to the fishing rod handle, said pad being disposed when in use so that its lengthwise extent in the top to bottom direction is substantially parallel to the lengthwise extent of the fishing rod handle and being substantially wider than the diameter of the fishing rod with which it is to be used and of sufficient length and longitudinal curvature to extend endwise downward beyond the butt of the fishing rod handle and curve underlyingly therebeneath when secured to the handle by said securing means, said pad being so positionally secured by said securing means relatively to the longitudinal axis of the fishing rod handle that the pad extends symmetrically in laterally opposite directions from the handle axis.

2. The attachment device as set forth in claim 1 wherein the upper end of said pad is secured by said securing means to said fishing rod handle by means of a hinge connection.

3. The attachment device as set forth in claim 1 wherein said pad is provided with rod engaging means to maintain the pad positively centered relatively to the longitudinal axis of the fishing rod.

4. An attachment device for securement to the handle of a fishing rod to provide a broad surfaced relatively stiff pad disposable against the fisherman's body for reducing the pressure exerted on the body by the handle butt of the fishing rod, comprising in combination, an anchor member adapted to be secured to the rod handle and having an outwardly projecting hinge element, means for fixedly securing said anchor member to the fishing rod handle, a broad surfaced relatively stiff pad member hingedly secured to said hinge element of said anchor member, said pad member being disposed when in use so that its lengthwise extent in the top to bottom direction is substantially parallel to the lengthwise extent of the fishing rod handle and being of sufficient length and longitudinal curvature to extend endwise beyond the butt of the fishing rod handle and curve underlyingly therebeneath when secured to the anchor member with the side of the rod handle butt in contact with the pad member, and a pair of parallel laterally spaced ridge formations extending from the said pad member to receive closely therebetween the contacting portion of the rod handle to thereby restrict relative lateral shifting between the pad member and rod handle.

5. An attachment device for securement to the handle of a fishing rod to provide a broad surfaced relatively stiff pad disposable against the fisherman's body for reducing the pressure exerted on the body by the handle butt of the fishing rod, comprising, in combination, an anchor member adapted to be secured to the rod handle and having at its lower end a freely projecting hinge element, means for detachably securing said anchor member to the fishing rod handle, a broad surfaced relatively stiff pad member having at its upper end a freely projecting hinge element adapted to be hingedly connected to the hinge element of said anchor member whereby said pad member may be swung downwardly or upwardly toward different portions of the fishing rod, said pad member being disposed when in use so that its lengthwise extent in the top to bottom direction is substantially parallel to the lengthwise extent of the fishing rod handle and being of sufficient length and longitudinal curvature to extend endwise beyond the butt of the fishing rod handle and curve underlyingly therebeneath when secured to the anchor member with the side of the rod handle butt in contact with the pad member.

6. An attachment device for securement to the handle of a fishing rod to provide a broad surfaced relatively stiff pad disposable against the fisherman's body for reducing the pressure exerted on the body by the handle butt of the fishing rod, comprising in combination, an anchor member adapted to be secured to the rod handle and having an outwardly projecting open topped hinge loop formation including a cylindrical bore which extends completely through to opposite ends of the hinge loop with the bore axis disposed for substantially perpendicular alignment relative to the long axis of the fishing rod when the said anchor member is secured to the fishing rod, means for securing said anchor member to the fishing rod handle, a broad surfaced relatively stiff pad member detachably secured to said anchor member by means of a swinging pintle rotatably disposed within and extending beyond the ends of the bore of the said hinge loop and secured to said pad member by a pair of arms extending from said pad member and secured to said pintle at axially spaced points thereof separated by at least the length of the said hinge loop, said pintle being of substantially the same diameter as said bore within which it is disposed, one of said arms being of greater thickness than the width of said hinge loop open top and the other of said arms having at least a portion thereof proximate to said pintle formed of reduced thickness not greater than the width of said hinge loop open top so that said pintle can be slipped endwise out of said bore by rotating the said pad member to a position where the said reduced thickness of the said other arm is shiftable endwise through the hinge loop open top to thereby detach the said pad member from the said anchor member, said pad member being disposed when in use so that its lengthwise extent in the top to bottom direction is substantially parallel to the lengthwise extent of the fishing rod handle and being of sufficient length and longitudinal curvature to extend endwise beyond the butt of the fishing rod handle and curve underlyingly therebeneath when secured to the anchor member.

7. An attachment device for securement to the handle of a fishing rod to provide a broad surfaced relatively stiff pad disposable against the fisherman's body for reducing the pressure exerted on the body by the handle butt of the fishing rod, comprising in combination, an anchor member adapted to be secured to the rod handle and having an outwardly projecting open topped hinge loop formation including a cylindrical bore which extends completely through to opposite ends of the hinge loop with the bore axis disposed for substantially perpendicular alignment relative to the long axis of the fishing rod when the said anchor member is secured to the fishing rod handle, a broad surfaced pad member detachably secured to said anchor member by means of a swinging pintle axially rotatably disposed within the bore of the said hinge loop and secured to said pad member by at least one arm extending from said pad member and secured to said pintle, said pintle being of substantially the same diameter as said bore within which it is disposed and of greater width than the open top of the said hinge loop, said at least one arm having at least a portion thereof proximate to said pintle formed of reduced thickness not greater than the width of said hinge loop open top so that said pintle can be slipped endwise out of said bore by rotating the said pad member to a position where the said reduced thickness of the said at least one arm is shiftable endwise through the hinge loop open top to thereby detach the said pad member from the said anchor member, and means for retaining said pintle within said hinge loop when said reduced thickness of said at least one arm is not in position to be shiftable endwise through the said hinge loop open top, said pad member being disposed when in use so that its lengthwise extent in the top to bottom direction is substantially parallel to the lengthwise extent of the fishing rod handle and being of sufficient length and longitudinal curvature to extend endwise beyond the butt of the fishing rod handle and curve underlyingly therebeneath when secured to the anchor member.

References Cited by the Examiner

UNITED STATES PATENTS

| | | | |
|---|---|---|---|
| 1,092,548 | 4/14 | Weber | 43—21.2 |
| 1,451,732 | 4/23 | Hipwood. | |
| 2,068,054 | 1/37 | Haislip | 224—5 |
| 2,158,104 | 5/39 | Bowen | 43—25 |
| 2,301,792 | 11/42 | Plumley | 24—205.14 |
| 2,526,981 | 10/50 | Von Beck | 248—38 |
| 2,995,855 | 8/61 | Bell | 43—21.2 |
| 3,115,722 | 12/63 | Mann | 43—21.2 |

ABRAHAM G. STONE, *Primary Examiner.*